Figure 1:
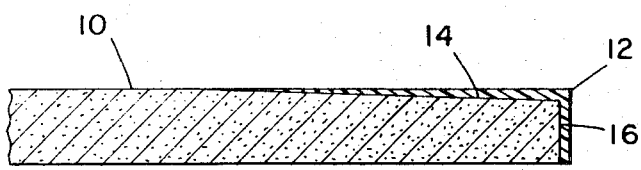

United States Patent [19]

Shull, Jr. et al.

[11] 3,842,551
[45] Oct. 22, 1974

[54] DRYWALL JOINT SYSTEMS AND METHOD FOR MAKING THE SAME

[75] Inventors: John D. Shull, Jr.; Richard E. Smith, both of Tonawanda; Joseph W. Schneller, Williamsville; William R. Burke, Tonawanda, all of N.Y.

[73] Assignee: National Gypsum Company, Buffalo, N.Y.

[22] Filed: Jan. 13, 1971

[21] Appl. No.: 106,169

Related U.S. Application Data

[62] Division of Ser. No. 844,306, July 24, 1969, Pat. No. 3,576,091.

[52] U.S. Cl............ 52/127, 52/309, 52/417, 161/44
[51] Int. Cl............................... E04b 2/72
[58] Field of Search............ 52/127, 173, 309, 417, 52/52, 161, 156; 161/44; 156/275, 304

[56] References Cited
UNITED STATES PATENTS

| | | | |
|---|---|---|---|
| 2,052,229 | 8/1936 | Hyde | 52/309 X |
| 2,089,087 | 8/1937 | Fletcher | 52/309 X |
| 2,378,801 | 6/1945 | Sidell et al. | 52/309 X |
| 2,392,734 | 1/1946 | Haberstump | 52/309 X |
| 3,206,899 | 9/1965 | Wright | 52/309 X |
| 3,350,257 | 10/1967 | Hourigan et al. | 52/309 X |
| 3,444,657 | 5/1969 | Swanson | 52/417 X |

FOREIGN PATENTS OR APPLICATIONS

| | | | |
|---|---|---|---|
| 1,026,223 | 4/1966 | Great Britain | 52/173 |

*Primary Examiner*—Alfred C. Perham
*Attorney, Agent, or Firm*—Robert F. Hause

[57] ABSTRACT

A method for forming drywall joint systems wherein abutting edges of adjacent wallboard panels are adjoined by a thermoplastic adhesive substance which acquires its adhesive properties when heated and allowed to cool. The thermoplastic adhesive is applied to the joint formed by adjacent wallboard panels after they are erected or it is pre-applied and then re-heated after wallboard erection. Joint systems formed according to the method may consist of the thermoplastic adhesive substance alone or with other joint-forming materials such as joint-reinforcing tape and/or a cementitious adhesive.

8 Claims, 4 Drawing Figures

INVENTORS.
John D. Shull Jr.
Richard E. Smith
Joseph W. Schneller
William R. Burk

BY

ATTORNEY

3,842,551

DRYWALL JOINT SYSTEMS AND METHOD FOR MAKING THE SAME

This application is a division of application Ser. No. 844,306, filed July 24, 1969 now U.S. Pat. No. 3,576,091.

BACKGROUND OF THE INVENTION

Drywall construction commonly involves applying a plurality of wallboard panels to framing thus forming joints between the adjacent board panels. A common method of concealing these joints consists of adhering thereover a narrow paper joint tape by means of an aqueous cementitious adhesive. After the adhesive has been allowed to dry for a period of about one day a thin layer of the cementitious adhesive is smoothly applied thereover, it being somewhat wider than the paper tape and tapered out to very thin edges. This second layer of adhesive material is allowed to dry for about one day and another thin layer of adhesive, somewhat wider, is applied thereover. In this manner a final substantially monolithic wall surface appearance is provided when the complete surface is covered with a decorative coating of paint or the like.

The paper tape provides reinforcing strength to the joint system, preventing cracking of the adhesive along the joint line. With this common technique for concealing drywall joints there often develops a slight ridge or bead on the wall surface directly over the joint. This defect can mar the monolithic appearance of the wall surface and costly repairs may be required to correct the condition. Moreover this method of forming joint systems requires a relatively long period of time due to the necessity of waiting about one day for each layer of adhesive to dry before the next layer can be applied.

SUMMARY OF THE INVENTION

The present invention relates to the use of thermoplastic adhesive substances, commonly referred to as hot melt adhesives, to form joint systems between adjacent wallboard panels.

It is an object of this invention to provide a novel method for concealing drywall joints in simulated monolithic wall construction and further to provide a method requiring less time than was heretoforce necessary to form joints of a quality at least equal to those made by the prior known methods. It is another object to provide such a method which forms joints which have improved resistance to beading. It is a further object to provide a simulated monolithic drywall surface including joints formed by the novel method.

Still another object is to provide novel wallboard panels which are adapted for forming the novel joint systems of the invention.

These and other objects and advantages of the present invention will be more fully apparent when considered in relation to the preferred embodiments thereof as set forth in the specification and as shown in the drawings in which:

FIG. 1 through FIG. 4 are end views of novel wallboard panels manufactured in accordance with the invention.

It should be understood that when reference is made herein to hot melt adhesives we mean thermoplastic substances which are composed of a thermoplastic polymeric material and a diluent system. The hot melt adhesive may be generally defined as 100 percent nonvolatile thermoplastic substances which exist in a solid form at room temperature and which become sufficiently fluid or tacky at elevated temperatures to be employed as adhesives.

The polymer is the essential ingredient in any hot melt adhesive system. Almost any thermoplastic polymeric material with adequate resistance to heat degradation can be suitable for incorporation into a hot melt adhesive. Examples of film-forming resins which are commonly used for this purpose are polyethylene, polyvinyl acetate, ethylene-vinyl acetate copolymers and the like. As the molecular weights of the polymers increase it may be generally said that the viscosities, strengths and mechanical properties of the adhesive systems increase.

The diluent system, which is usually a blend of materials such as a wax, a plasticizer, a heat stabilizer and perhaps dyes, an inert filler or an extender, makes it possible to utilize the properties of the polymer. The diluent functions as the vehicle for the polymer, lowering its viscosity thus making it more convenient to apply as well as enhancing its wetting ability and adhesive strength.

According to the invention the hot melt adhesives are utilized as the basis for various joint systems formed between adjacent drywall panels such as gypsum wallboard. In one commonly used form of gypsum wallboard, a generally rectangular panel with a set gypsum core enclosed on its two main surfaces and two longitudinal edges by a paper facing layer, the front surfaces of the individual board panels have a substantially flat central surface disposed between recessed marginal surfaces of substantially greater width than depth extending in the longitudinal direction. The recessed marginal surface starts at a distance of from about 2 ½ to 3 inches from the panel edge and slopes downwardly to a maximum depth of from about 0.050 to about 0.070 inch. The invention will be described in detail with respect to this form of gypsum wallboard although it should be recognized that it may be practiced with various types of drywall materials as well as with gypsum wallboard having differently shaped edges.

When these wallboard panels are erected in edgewise abutting relationship on framing, the abutting edges of adjacent panels thus define a shallow recessed area which extends on both sides of the joint. Subsequently this recessed area, which is commonly known within the industry as the taper area, is filled with joint-concealing material. The particular joint system used must have a smooth, substantially flat outer surface which is substantially level with the central surfaces of the wallboard panels, somewhat wider than the taper area and which tapers out to very thin edges. The novel joint systems of the invention can consist of only the hot melt adhesive or a base layer of the thermoplastic adhesive covered with one or more layers of another suitable joint-forming material. Narrow strips of joint-reinforcing materials may be embedded within the joint systems for added strength where it is so desired. It is preferred to use paper joint tape or open mesh fiber cloths made from relatively strong material such as glass fiber to reinforce the drywall joints. The thermoplastic adhesive is preferably applied in a layer having a maximum thickness of from about 0.010 to about 0.070 inch. The width of the layer can vary considerably, it being dependent upon factors such as the type of joint system formed, the method used to apply the thermoplastic adhesive to the joint and the type of drywall as well as the shape of its edges as will be seen further below.

The joint systems formed in accordance with the invention are capable of being finished in a significantly shorter period of time than is required for those made with the prior known method. When the hot melt adhesives are heated to elevated temperatures sufficient to give them fluid properties — in most cases 300° to 400°F — they can readily be applied to drywall joints. These adhesives subsequently cool very rapidly thus returning to a solid form in a period of about a minute or less. A layer of a decorative coating composition can then be immediately applied thereover. Where it is desired to dispose a covering layer of another joint-forming material, e.g., an aqueous cementitious adhesive, it is not necessary to observe any extended waiting period before doing so. Thus this novel method of forming drywall joints eliminates the necessity of waiting about one day after the initial layer of adhesive has been laid down before the next layer can be applied as has heretofore been the case. This reduction in the time required to form joint systems can lead to significant economies for contractors in the building industry. Moreover, these novel joint systems have been shown to be of a quality at least equal to those made by the prior known method. Strength tests have shown that joint systems employing the thermoplastic adhesives perform favorably in comparison with those utilizing paper joint tape embedded in an aqueous cementitious adhesive.

Another advantage of forming joint systems with the method of the present invention is that it is possible thereby to decrease the tendency of the joint to bead. "Beading" is a joint deformity which appears as a line or ridge along the joint. Unfortunately when this condition occurs it is not apparent at the time the joint treatment is completed and may require several months to develop and manifest itself. When it does occur costly redecorating procedures may be necessary to correct the defect. This condition appears to be due to a number of factors all of which are not completely understood in view of the difference of opinion which exists within the industry relative to the cause of the problem and methods for preventing its occurrence. It is generally agreed, however, that moisture is one of the most significant factors causative of this condition. With the joint systems of the invention at least a substantial part of the wallboard surfaces in the joint area are covered with a hot melt adhesive most of which are highly water resistant. By using a water-resistant thermoplastic adhesive the amount of water which could be absorbed by the wallboard in the joint area is greatly diminished thus reducing the possibility of beading occurring.

Since the hot melt adhesives effect an instant bond with the drywall panels these novel joint systems can be utilized to great advantage in industrialized or prefabricated construction where complete wall surface assemblies are constructed at a manufacturing plant for later erection at a building site. The thermoplastic adhesives, by effecting an instant bond, will rigidize the wall surface assembly sufficiently to allow it to be immediately moved within the plant or transported to the building site. The ability to move these assemblies immediately after the joint system is formed can greatly increase the rate at which they can be made by the manufacturer.

Various methods can be utilized to form drywall joints with hot melt adhesives. One such technique consists of coating the adhesive on the longitudinal edges of the individual panels at the wallboard manufacturing plant. The thermoplastic substance can conveniently be applied to the panels by heating it to an elevated temperature at which it becomes fluid and coating it on the appropriate edges as the panels proceed along a continuous conveyor belt. When this application technique is employed it is preferred to cover the edge surface completely with the adhesive.

Figure 2:
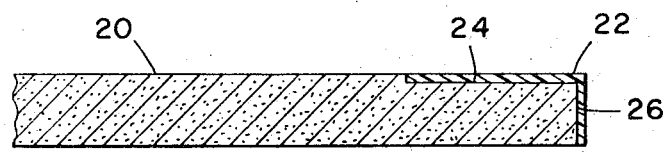
Figure 3:
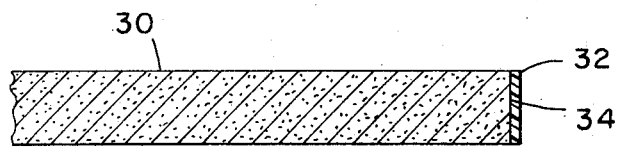

FIG. 1, FIG. 2 and FIG. 3 are illustrative of some of the edge formations which the wallboard panels could have and the manner in which a layer of thermoplastic adhesive could be disposed thereover. These are end views of a section of the wallboard panels which have a layer of hot melt adhesive adhered thereto. The panels can be erected at a building site by the procedures normally employed since it is possible to drive a nail or a screw through the adhesive substance. When the panels are erected the adhesive is then heated to cause it to become substantially fluid thus enabling the adhesive layers on the adjacent panel edges to flow together. An integral layer of the adhesive is formed over the joint when the adhesive cools.

Referring to FIG. 1, there is shown a portion of a wallboard panel 10 with hot melt adhesive 12 disposed on the tapered recessed marginal surface 14 and on the longitudinal edges 16. FIG. 2 shows a portion of a modified panel 20 with hot melt adhesive 22 on a flat, recessed, marginal surface 24 and on the longitudinal edges 26. FIG. 3 shows a portion of a still further modified panel 30 with hot melt adhesive 32 disposed only on the longitudinal edge 34. All three will be seen to be formed with the hot melt adhesive forming substantially 90° corners at the junction of the front surfaces of the panels 10, 20 or 30 and the perpendicular edge surfaces.

Figure 4:
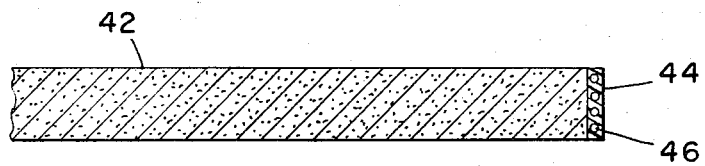

A number of techniques may be utilized to heat the adhesive after the wallboard panels have been erected. Thin, high resistance electrical wires can be embedded in the adhesive layer as it is applied to the panels at the wallboard manufacturing plant with the ends of the wires being allowed to remain exposed. After erection of the panels the exposed wires can be connected to an electrical power source, e.g., a wet or dry cell battery, which is suitable to generate an electrical current sufficient to cause the adhesive to become substantially fluid. The temperature of the adhesive can be quickly elevated to the level necessary to accomplish this result in this manner. After the integral layer of adhesive has been formed over the joint the wires can be left embedded in the adhesive layer with the exposed ends either removed or concealed with a covering layer of another joint-forming material. It is preferred to have about four to six wires for a layer of adhesive having a width of ½ inch; however, the number of wires necessary and the current required are dependent upon the particular hot melt adhesive applied to the panels. FIG. 4 is an end view of a section of a wallboard panel 42 having the thin high resistance electrical wires 46 located in the adhesive layer 44. The thermoplastic adhesive can also be heated to a substantially fluid form by means of a heat gun or by dielectric heating.

Numerous hot melt adhesives are commercially available at the present time. These substances can have greatly varying viscosities, melting temperatures, bonding strengths, setting times, etc. It must be left to the practitioner to determine which particular adhesive would be best suited for a specific application with regard to the type of wallboard, the method of application and various other considerations which are readily apparent to those skilled in the art. The method of the invention allows the formation of drywall joint systems of high quality in significantly shorter periods of time than were necessary with the prior known method thus enabling those engaged in the field of simulated monolithic wall construction to achieve substantial economies.

Having given a detailed description of the preferred embodiments of the invention so that those skilled in the art may practice the same we contemplate that variations may be made therein.

We claim:

1. A wallboard for forming a simulated monolithic wall comprising a generally rectangular panel having a substantially flat front surface and edge surfaces substantially perpendicular to said front surface and a layer of a set thermoplastic adhesive substantially completely covering each longitudinal edge surface of said panel, said thermoplastic adhesive forming substantially 90° corners at the junctions of said front surface and each of said perpendicular edge surfaces, said generally rectangular panel consisting of a set gypsum core enclosed on its two opposite sides and two longitudinal edges by a paper facing layer, said paper being free of said thermoplastic adhesive throughout a major portion of said front surface.

2. A wallboard for forming a simulated monolithic wall comprising a generally rectangular panel having a substantially flat front surface and edge surfaces substantially perpendicular to said front surface and a layer of a set thermoplastic adhesive substantially completely covering each longitudinal edge surface of said panel, said thermoplastic adhesive forming substantially 90° corners at the junctions of said front surface and each of said perpendicular edge surfaces, and said set thermoplastic adhesive having high resistance electrical wires embedded therein.

3. A wallboard as defined in claim 2 having thin high resistance electrical wires embedded in said layers of set thermoplastic adhesive with the ends of said wires remaining exposed.

4. A wallboard as defined in claim 2 wherein said wires are disposed in parallel relation at spacing of about 1/10 inch.

5. A wallboard for forming a simulated monolithic wall comprising a generally rectangular panel having a substantially flat front surface and edge surfaces substantially perpendicular to said front surface and a layer of a set thermoplastic adhesive substantially completely covering each longitudinal edge surface of said panel, said thermoplastic adhesive forming substantially 90° corners at the junctions of said front surface and each of said perpendicular edge surfaces, said substantially flat front surface consisting of a flat central surface disposed between recessed marginal surfaces extending from said flat surface to opposite longitudinal edges of said panel, and a layer of a set thermoplastic adhesive adhered to and covering a substantial part of said recessed marginal surfaces.

6. A wallboard as defined in claim 5 wherein said generally rectangular panel consists of a set gypsum core enclosed on its two opposite sides and two longitudinal edge surfaces by a paper facing layer.

7. A wallboard as defined in claim 5 wherein said recessed marginal surfaces taper edgewise toward the rear side of the panel.

8. A wallboard as defined in claim 5 wherein said recessed marginal surfaces are in a spaced parallel plane relative to said flat central surface.

* * * * *